United States Patent [19]

Lazzari

[11] Patent Number: 5,196,976
[45] Date of Patent: Mar. 23, 1993

[54] MAGNETORESISTANCE MAGNETIC HEAD FOR PERPENDICULAR RECORDING ON A MAGNETIC SUPPORT

[75] Inventor: Jean-Pierre Lazzari, Corenc, France

[73] Assignee: Commissariat a l'Energie Atomique, Paris, France

[21] Appl. No.: 603,757

[22] PCT Filed: Mar. 28, 1990

[86] PCT No.: PCT/FR90/00212

§ 371 Date: Nov. 16, 1990

§ 102(e) Date: Nov. 16, 1990

[87] PCT Pub. No.: WO90/11594

PCT Pub. Date: Oct. 4, 1990

[30] Foreign Application Priority Data

Mar. 29, 1989 [FR] France .................. 89 04061

[51] Int. Cl.⁵ .......................... G11B 5/39; G11B 5/30
[52] U.S. Cl. ................................. 360/113; 360/110; 360/126; 360/122
[58] Field of Search ............... 360/110, 120, 122, 125, 360/126, 113; 324/252; 338/32 R

[56] References Cited

U.S. PATENT DOCUMENTS

| | | | |
|---|---|---|---|
| 4,438,470 | 3/1984 | Sawada | 360/113 |
| 4,639,289 | 1/1987 | Lazzari | 360/122 |
| 4,782,415 | 11/1988 | Vinal | 360/113 |
| 4,843,505 | 6/1989 | Mowry | 360/113 |
| 4,901,177 | 2/1990 | Lazzari | 360/113 |
| 4,922,360 | 5/1990 | Takaro et al. | 360/113 |
| 4,949,207 | 8/1990 | Lazzari | 360/126 |
| 4,984,118 | 1/1991 | Springer | 360/122 |
| 4,987,509 | 1/1991 | Gill et al. | 360/113 |
| 5,025,341 | 6/1991 | Bousquet et al. | 360/126 |
| 5,081,554 | 1/1992 | Das | 360/113 |

FOREIGN PATENT DOCUMENTS 154005 9/1985 European Pat. Off.
0317471 5/1989 European Pat. Off.

OTHER PUBLICATIONS

Patent Abstracts of Japan, vol. 7, No. 6 (P-167) (1151) 11 Jan. 1983, & JP-A-57 164414 (Fujitsu K.K.) 9 Oct. 1982.
Patent Abstracts of Japan, vol. 8, No. 237 (P-310) (1674) 30 Oct. 1984, & JP-A-59 112421 (Nippon Denki K.K.) 28 Jun. 1984.
Patent Abstracts of Japan, vol. 7, No. 212 (P-224) (1357) 20 Sep. 1983, & JP-A-58 108025 (Nippon Victor K.K.) 28 Jun. 1983.
Patent Abstracts of Japan, vol. 10, No. 344 (P-518) (2400) 20 Nov. 1986, & JP-A-61 145720 (Fujitsu K.K.) 3 Jul. 1986.
Patent Abstracts of Japan, 8 No. 211 (P-303) (1648) 26 Sep. 1984, & JP-A-59 094218 (Toshiba K.K.) 30 May 1984.
Patent Abstracts of Japan, vol. 6, No. 233 (P-156) (1111) 19 Nov. 1982, & JP-A-57 133513 (Fujitsu K.K.) 18 Aug. 1982.
I.E.E.E. Transactions of Magnetics vol. 25, No. 5 Sep. 1989, New York, N.Y., USA, pp. 3686–3688 D. W. Chapman: "A New Approach to Making Thin Film Head-Slider Devices".

Primary Examiner—Stuart S. Levy
Assistant Examiner—Alfonso Garcia
Attorney, Agent, or Firm—Oblon, Spivak, McClelland, Maier & Neustadt

[57] ABSTRACT

A horizontal magnetic reading head for a perpendicular recording on a magnetic tape.

A magnetic layer (50,51,52) is interrupted by two spacers arranged symmetrically with respect to the plane of a monopole (56). A U-shaped magnetoresistant element is constituted by two ribbons (34,35) parallel to the monopole and respectively located in the two spacers of the magnetic layer. The two ribbons are joined by a magnetoresistant bridge (36). Optionally, the head can have a conductor coil so that it could write in addition to read.

4 Claims, 6 Drawing Sheets

MAGNETORESISTANCE MAGNETIC HEAD FOR PERPENDICULAR RECORDING ON A MAGNETIC SUPPORT

BACKGROUND OF THE INVENTION

1. Field of the Invention

The present invention relates to a magnetoresistance magnetic reading head for a perpendicular recording, as well as to a process for producing such a head. The invention is used in reading on a magnetic tape and optionally writing information on a support such as a disk or tape.

2. Discussion of the Background

A known horizontal magnetic reading and writing head for a perpendicular recording on a magnetic tape is shown in FIG. 1. It is possible to see a thick horizontal magnetic layer 2 having a central pole piece 3, a conductor coil 4 surrounding said pole piece and embedded in an insulating layer 5, a thin magnetic monopole 6 extending the central pole piece and finally a hard dielectric layer 7 making it possible to obtain an outer planar surface ("flight plane").

The support on which the information is written and read is constituted by a magnetic layer 10 deposited on a substrate 12. The assembly passes infront of the monopole 6.

The operation of such an apparatus is as follows. The magnetic field created by the flow of a current in the coil 4 has its lines very close together in the monopole 6 and divides and is then closed again by the lateral pole pieces of the thick magnetic layer 2. Under these conditions, the magnetic induction in the recording zone of the layer 10 is perpendicular thereto. This is why such apparatuses are called perpendicular or vertical recording heads. On reading, the variation of the flux detected by the monopole induces a current in the coil. Such a head is recorded in U.S. Pat. No. 4,731,157 granted to J. P. Lazzari on Mar. 15, 1988.

It is also pointed out that another category of reading and writing heads designed for reading or writing a magnetic induction located in the plane of the magnetic layer is known. The heads are called longitudinal or horizontal recording heads. They comprise a magnetic circuit with an air gap. They play no direct part in the present invention.

Independently of the technology of thin film heads, efforts have been made to form magnetic information reading heads using magnetoresistant elements. It is known that a magnetoresistor has magnetization, whose direction can rotate under the effect of an external magnetic field. This rotation is accompanied by a variation $\Delta R$ of the resistance R of the layer. This resistance can be measured by passing a weak current into the layer. In practise, for a 0.1 $\mu$m thick iron-nickel layer, the resistance variation is approximately 1% when the angle of the magnetization turns by 90°. To increase the sensitivity of the measurement and improve the linearity, it is possible to orient the magnetization of the magnetoresistance layer beforehand to 45° of the current lines.

Such a magnetoresistance apparatus is described in U.S. Pat. No. 4,703,378, the apparatus being placed beneath a space interrupting a magnetic circuit forming an air gap.

In the same way, European Patent 284 495 describes an apparatus with two magnetoresistors positioned to the rear of a magnetic circuit defining an air gap.

In all cases, these are heads for longitudinal recording, i.e. with an air or head gap. No perpendicular recording apparatus equipped with a magnetoresistor is known.

SUMMARY OF THE INVENTION

The present invention aims at eliminating this short coming by proposing a thin film head for perpendicular recording with a magnetoresistant element. However, in the case of perpendicular recording heads, the presence of the monopole makes it difficult to introduce a magnetoresistor and it is no longer possible to use the means inherent in air gap heads.

The present invention solves this difficulty by using a U-shaped magnetoresistant element placed in two spaces in the magnetic layer, the two ribbons constituting the two branches of the U being parallel to the monopole. These two ribbons are joined by a magnetoresistant bridge. Such a head only constitutes a reading head. However, it is always possible to add to it a conductor coil in order to simultaneously obtain a reading and writing head.

The present invention also relates to a process for producing such a head.

BRIEF DESCRIPTION OF THE DRAWINGS

The invention is described in greater detail hereinafter relative to non-limitative embodiments and the attached drawings, wherein.

DESCRIPTIONS OF THE PREFERRED EMBODIMENTS

Figure 1:
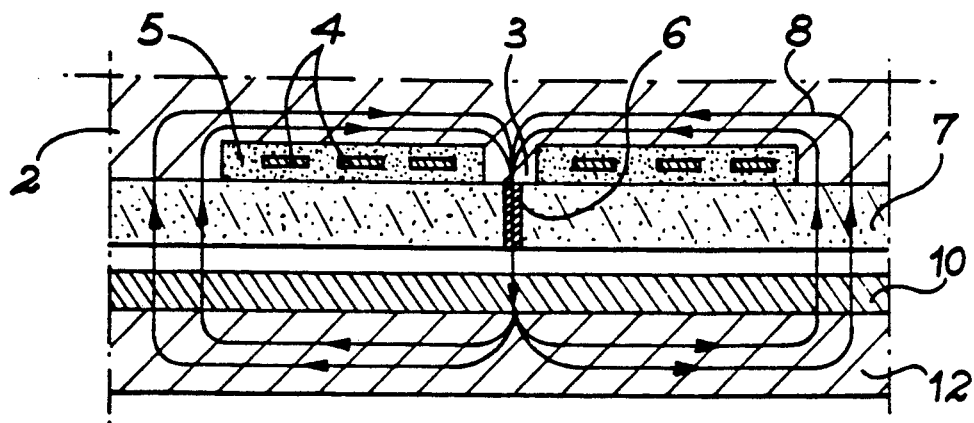
FIG. 1 shows a perpendicular recording magnetic head according to the prior art.
Figure 2:
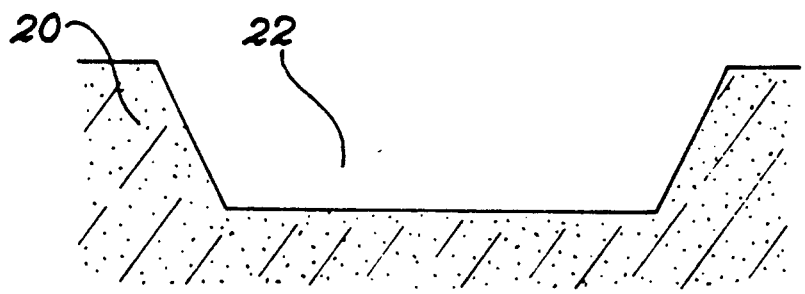
FIG. 2 shows a first stage of the production process according to the present invention.
Figure 3:
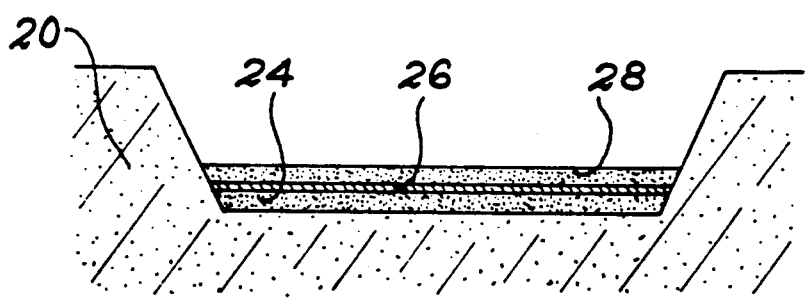
FIG. 3 shows a second stage of the process consisting of depositing layers.
Figure 4:
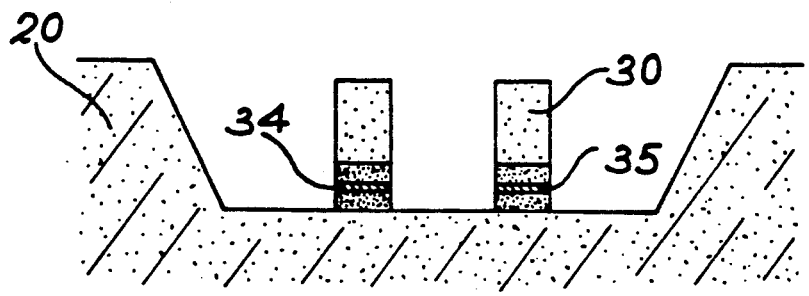
FIG. 4 shows the deposited layers etched to form the magnetoresistant ribbons.
Figure 5:
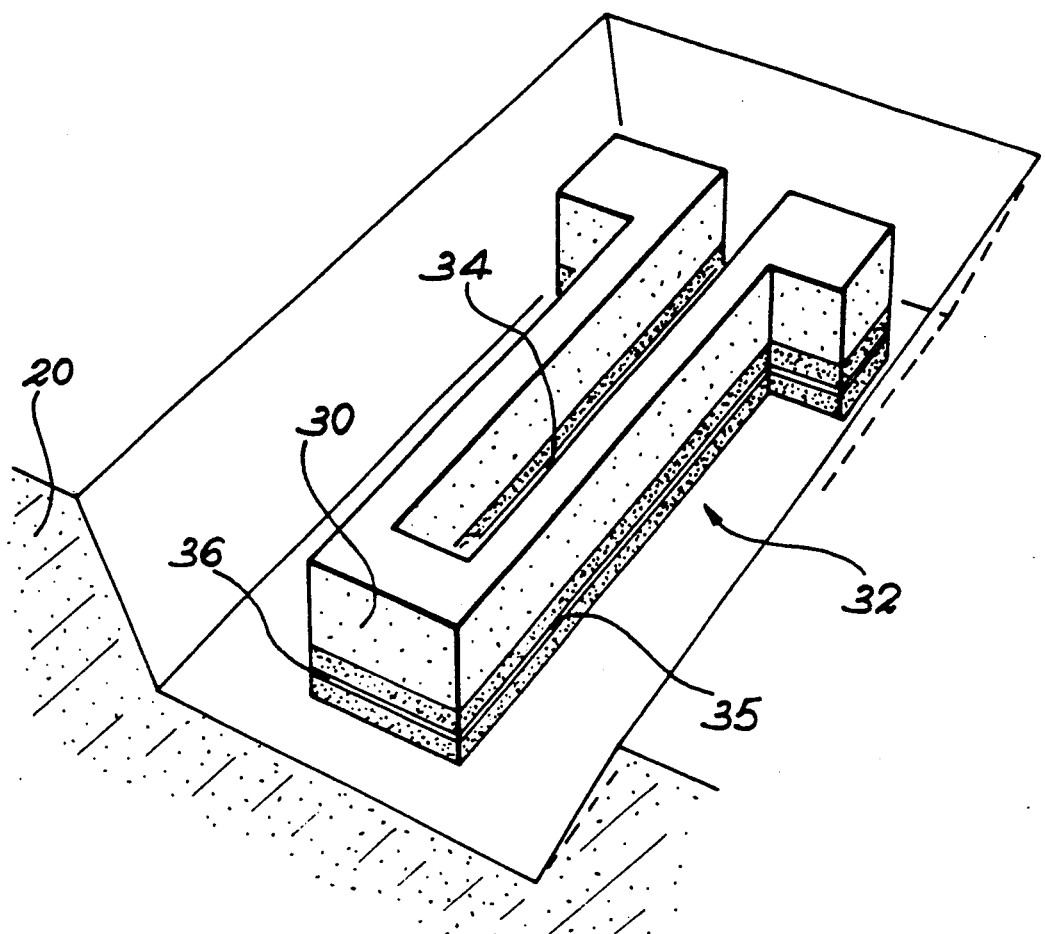
FIG. 5 is a perspective view of FIG. 4.
Figure 6:
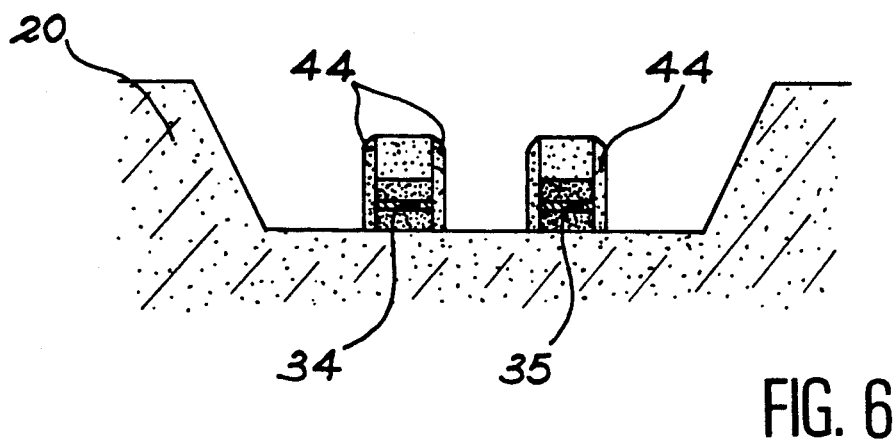
FIG. 6 shows an insulant deposited on the side walls of the magnetoresistant ribbons.
Figure 7:
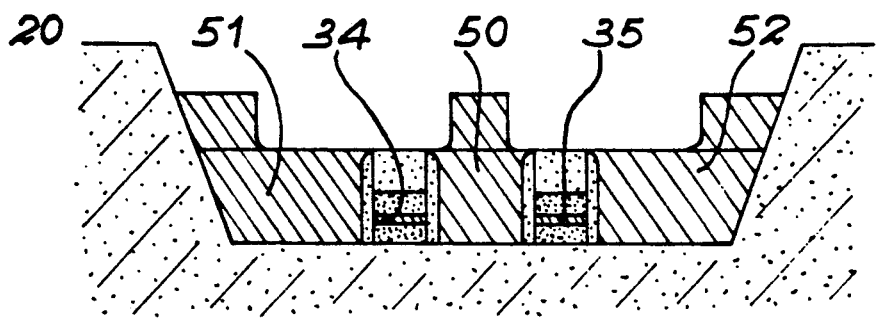
FIG. 7 shows a supplementary stage of forming a thick magnetic layer.
Figure 8:
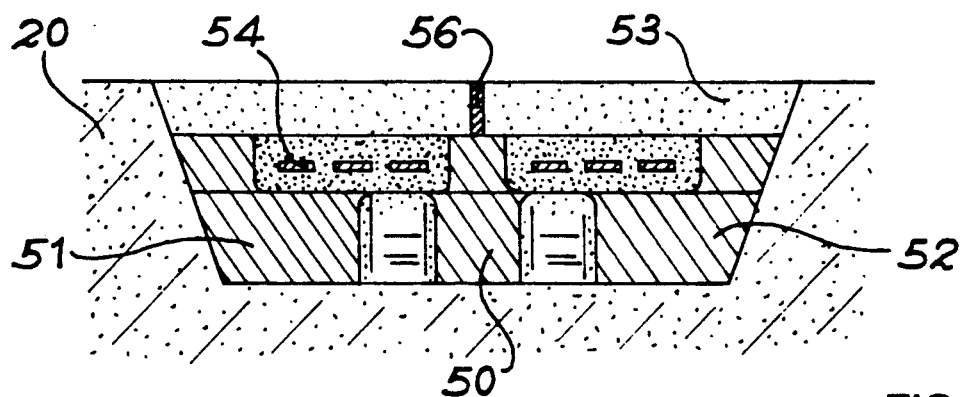
FIG. 8 is a cross section through the head obtained.

FIGS. 2 to 8 show various stages in a production process of a reading and writing head according to the invention. A recess 22 (FIG. 2) is formed in an e.g. silicon semiconductor substrate 20. At the bottom of said recess 22 is deposited three layers constituted by a first insulating layer 24, e.g. of silica SiO$_2$, a magnetoresistant material layer 26, e.g. of iron-nickel and a second insulating layer 28, e.g. of silica (FIG. 3). The three layers are etched with a resin mask 30 (FIG. 4) to obtain a U-shaped pattern 32 (FIG. 5) with two branches containing two magnetoresistant ribbons 34, 35 and a magnetoresistant bridge 36. During this etching operation, it is ensured that the resin 30 used for masking purposes is not dissolved. On the side walls of said etched pattern is deposited a vertical insulating layer 44 (FIG. 6) using a method described in the aforementioned U.S. Pat. No. 4,731,157. These layers can be 0.2 or 0.3 μm thick. Part of the recess is filled with a 2 to 5 μm thick magnetic layer to obtain a central pole piece 50 between the two ribbons 34, 35 and two lateral zones 51, 52 on either side of the pattern (FIG. 7). This operation can be carried out by electrolytic deposition, as is e.g. described in European Patent 262 028 (or its equivalent U.S. Pat. No. 4,837,924), using a conductive layer forming an electrode, or by using the substrate 20 as the electrode, if it is sufficiently conductive. A monopole 56 is formed above the central pole piece 50, in the manner described in U.S. Pat. No. 4,731,157 and on either side of the monopole filling takes place with a hard dielectric material 53, e.g. silica, followed by planarization (FIG. 8).

In order to obtain a head which can be used for writing as well as reading, a conductor coil 54 will be formed in the manner illustrated in FIG. 8 using the method described in the aforementioned U.S. Patent. In the opposite case, the magentic layer deposited by electrolysis will be limited until it is flush with the top of the resin layer 30, followed by the formation of the vertical monopole, which somewhat reduces the height of the head.

Figure 9:
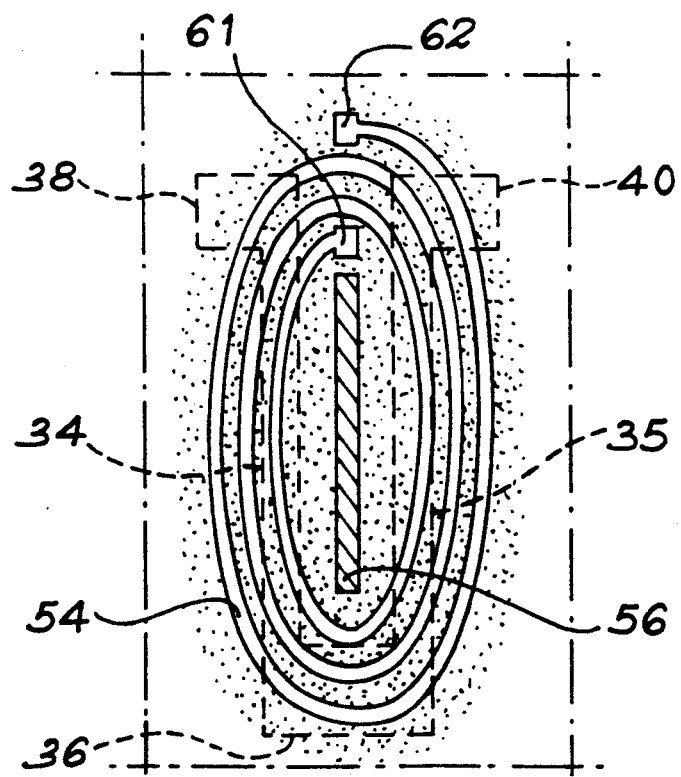
FIG. 9 is a plan view of the head.

FIG. 9 shows in plan view the head obtained in the coil variant. It is possible to see the two connectors 38, 40 at the free ends of the two ribbons 34, 35. These connections take place through the resin 30 and the upper insulating layer 28 (cf. FIGS. 4 and 5). Contacting can also take place on the bridge 36 to obtain a differential operation, as will be made more readily apparent hereinafter.

FIGS. 10 to 13 illustrate the operation of the head when reading, in a so-called differential mode.

Figure 10:
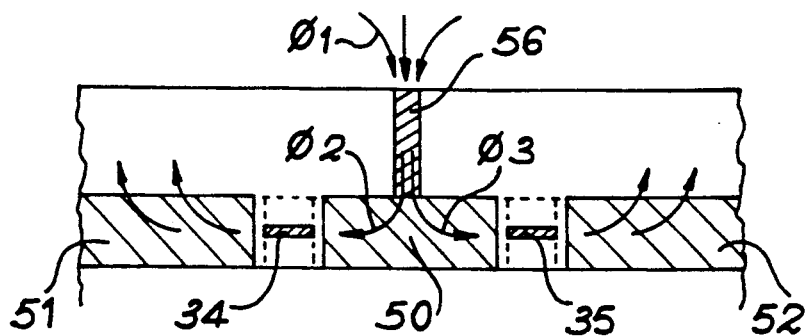
FIG. 10 diagrammatically illustrates the distribution of the magnetic reading flux.

In FIG. 10, where certain auxiliary means are now shown for simplification reasons, it is possible to see that the leakage flux $\phi 1$ from the recording layer passing infront of the head is detected by the monopole 56 and is subdivided into two fluxes $\phi 2$, $\phi 3$ moving in opposite directions. These fluxes traverse the magnetoresistant ribbons 34, 35.

Figure 11:
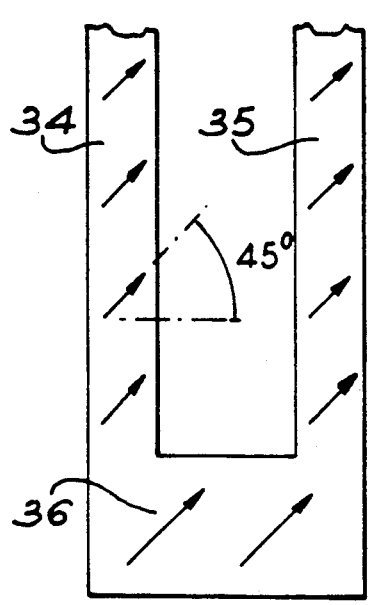
FIG. 11 shows the orientation of the magnetization in the magnetoresistant layer in the nonoperating state.

The thickness of the magnetoresistant layer (approximately 0.1 μm) is much smaller than that of the magnetic layer 50, 51, 52 (2 to 5 μm), so that the field corresponding to the fluxes $\phi 2$ and $\phi 3$ creates an intense induction in the magnetoresistant layer. This will have the effect of rotating or turning the magnetization of the magnetoresistant layer. In the non-operating state, i.e. outside any external field, the magnetic induction in the magnetoresistant layer is at 45° with respect to the axis of the monopole (FIG. 11). This magnetization direction given by the magnetocrystalline anisotropy during the growth of the thin magnetoresistant layer 26 is opposed by the anisotropy due to the ribbon shape of the magnetoresistant elements. The second anisotropy, which exceeds the first, has the tendency to orient the magnetization in the non-operating state in the lengthwise direction of the ribbons. However, when the thick iron-nickel layer 50, 52, 52 is produced, it very closely surrounds the magnetoresistant ribbons, because it is only separated from them by the insulating walls 44 (cf. FIG. 6), whose thickness is 0.2 to 0.3 μm. Therefore the thin layer or film constituting the magnetoresistant ribbons is highly coupled to the thick iron-nickel layer, which minimizes the demagnetizing fields on the edges of the ribbon and considerably reduces the form anisotropy. Thus, the magnetization orientation in the magnetoresistant layer is 45° in the manner illustrated in FIG. 11.

Figure 12:
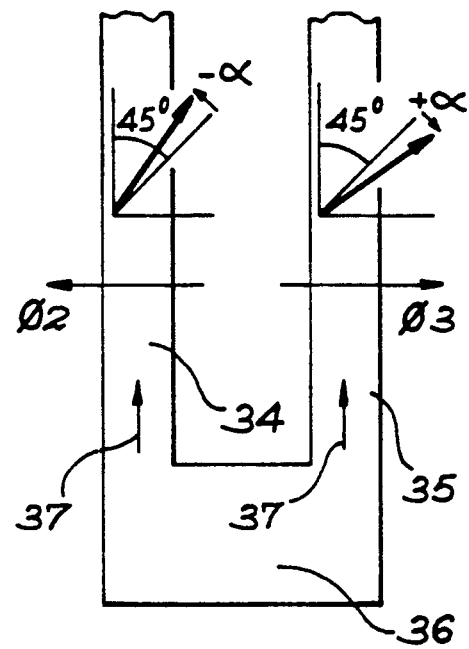
FIG. 12 shows the opposite rotations of the magnetization in the case of a differential reading.

The switching of the magnetization caused by the fluxes $\phi 2$ and $\phi 3$ is illustrated in FIG. 12. The magnetization rotates by $-\alpha$ in branch 34 and $+\alpha$ in branch 35. A current 37 flowing in the two branches will make it possible to read two different resistances corresponding to the resistances of the material for the orientation $(45-\alpha)°$ and $(45+\alpha)°$.

Figure 13:
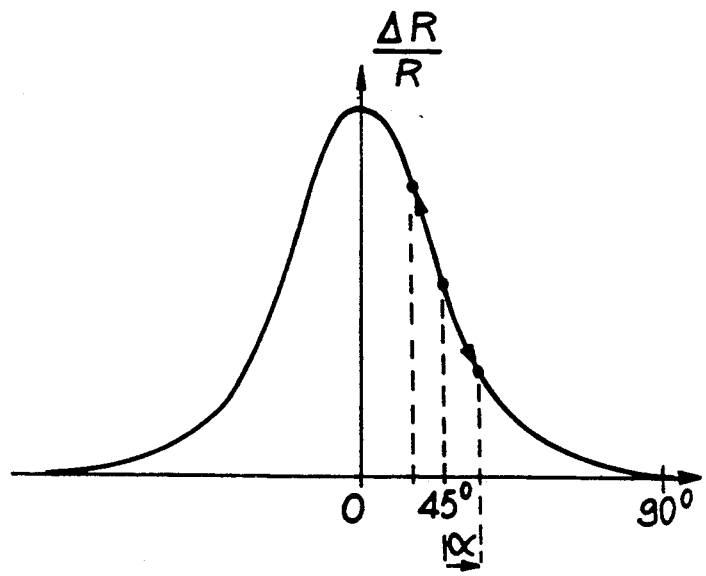
FIG. 13 illustrates the resistance variation of the two magnetoresistant ribbons due to the rotations of the magnetization.

The relative variation of this resistance of $\Delta R/R$ is shown in FIG. 13. The resistance increases in the left-hand branch and decreases in the right-hand branch. By connecting a differential amplifier between the ends of the ribbons 34 and 35 with respect to the common output 36, the measurement variation will be doubled compared with the intrinsic resistance variation of the magnetoresistant material. However, a parasitic magnetic flux from the outside will have the same direction in the two branches of the magnetoresistant element and will no disturb the measurement.

Figure 14:
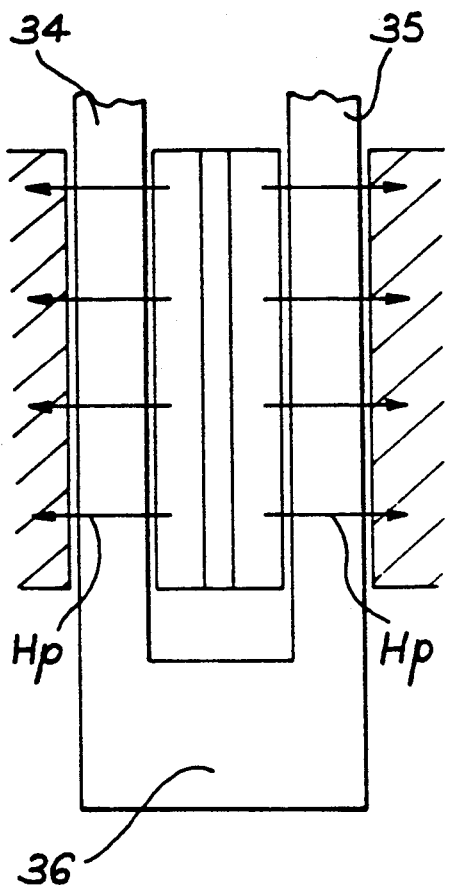
FIG. 14 diagrammatically illustrates the lines of a polarization field.
Figure 15:
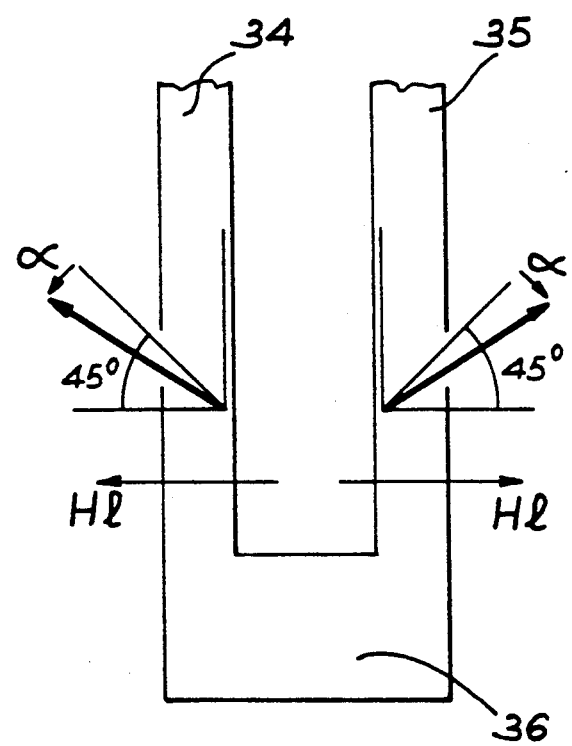
FIG. 15 shows the rotation of the magnetization of reading in series.
Figure 16:
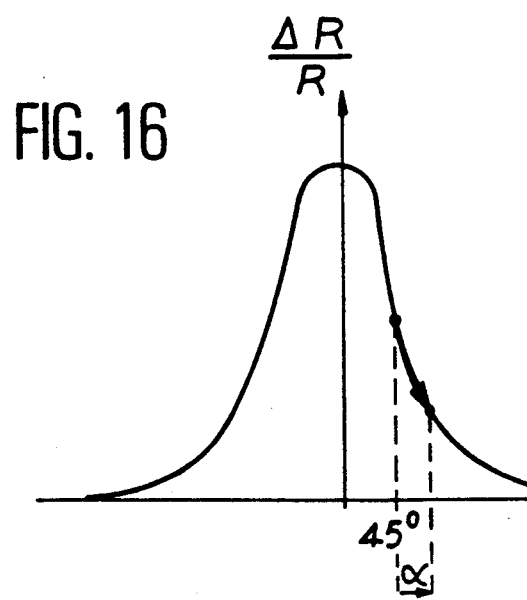
FIG. 16 shows the resistance variation of each of the magnetoresistant ribbons due the rotation.

A second embodiment of the device according to the invention can be used and this is illustrated in FIGS. 14 to 16. In this case, a weak current is passed into the conductor coil 54 (cf. FIG. 8) used for writing, i.e. the head must be designed with such a coil, namely as both a reading and writing head. The polarization field Hp assumes opposite directions (FIG. 14). This weak current imposes a magnetization in the magnetoresistant layer, which is at 45° from the monopole axis, but is oriented in different directions in the two branches of the magnetoresistant element (FIG. 15).

Thus, a reading field Hl will switch the magnetization by an angle $\alpha$ in the same way in both branches (FIG. 15). The relative variation of the resistance $\Delta R/R$ due to the angle rotation will then be the same in both branches.

In this case, there is no longer a common mode as in the differential arrangement, but instead two identical means connected in series. This variant has the advantage of no longer requiring a third connector on the bridge 36. The two connectors at the free ends of the ribbons 34 and 35 are adequate.

Figure 17:
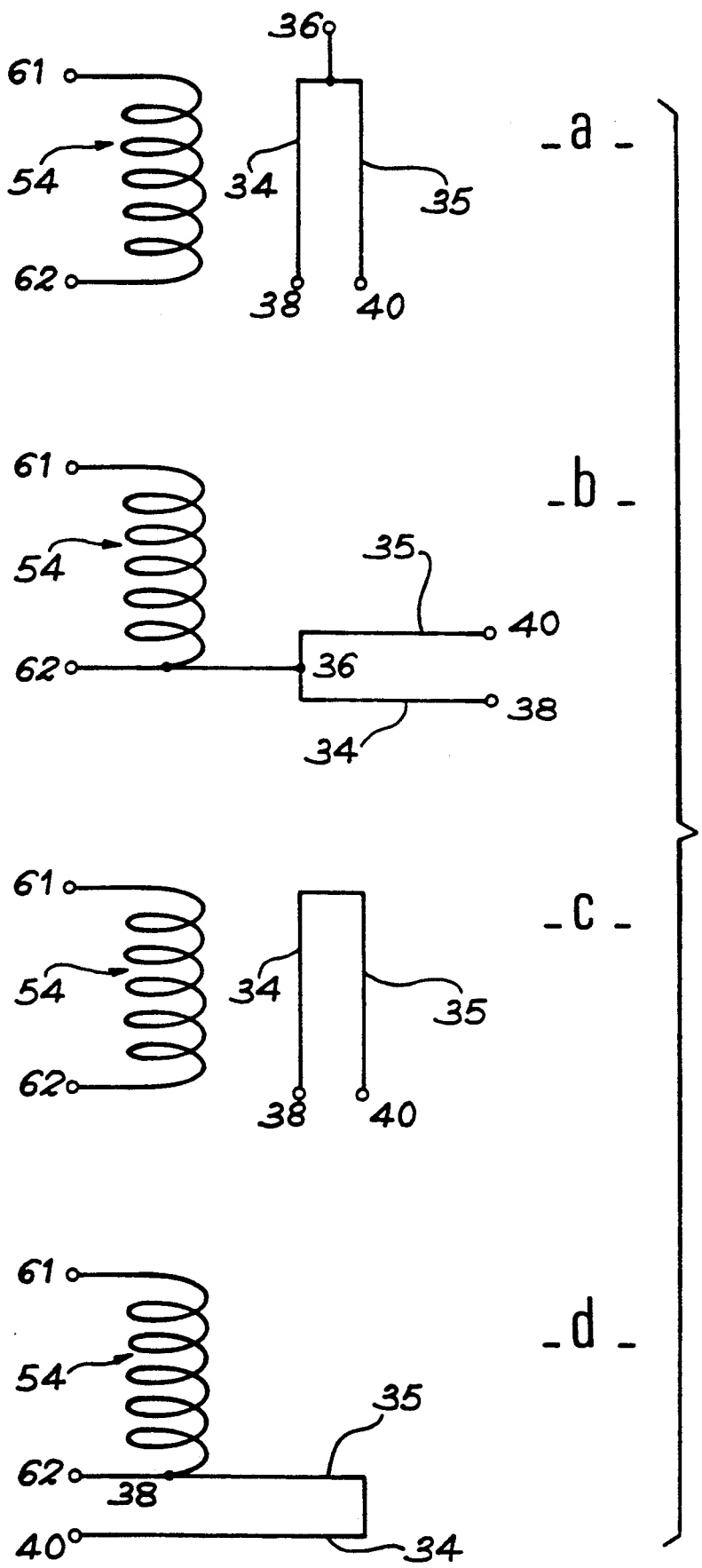
FIG. 17 (a, b, c, d) shows four possible branches for the conductor coil and the magnetoresistant element.

FIG. 17 shows several connections of various head inputs and outputs. In part (a), the terminals 61, 62 of the conductor coil 54 are independent of the three coils 36, 38, 40 of the magnetoresistant element 34, 35. The latter is connected for a differential operation with three connections. In part (b), the connection 36 of the magnetoresistant element is connected to one of the terminals 62 of the conductor coil 54, still in a differential operating mode. In part (c), the magnetoresistant element only has two connections for a series operation and the two connections of the coil are independent of the connections of the magnetoresistant element. Finally, in part (d), the terminals 38 and 62 are joined together and the magnetoresistant element operates in series.

I claim:

1. Horizontal magnetic head for a perpendicular recording on magnetic support, comprising:
a semiconductor substrate having therein, a horizontal magnetic layer having a central pole piece surmounted by a thin vertical monopole flush with a surface of the head, wherein the magnetic layer is interrupted by two spacers arranged symmetrically with respect to a plane of the monopole and parallel thereto, the magnetic layer comprises a U-shaped magnetoresistant element, constituted by two ribbons parallel to the monopole and respectively arranged in the two spacers of the magnetic layer and a bridge connecting the two ribbons, the U-shaped magnetoresistant element having two ends connected to connectors constituting reading outputs of the head.

2. Magnetic head according to claim 1, wherein the bridge connecting the two magnetoresistant ribbons is connected to a third reading output.

3. Magnetic head according to claim 1, further comprising:
a conductor coil surrounding the central pole piece and connected to two writing outputs so that the head is consequently a reading and writing head.

4. Magnetic head according to claim 3, wherein one of the writing outputs of the conductor coil is connected to one of the reading outputs of the magnetoresistant element.

* * * * *